US007002901B2

(12) United States Patent
Yun et al.

(10) Patent No.: US 7,002,901 B2
(45) Date of Patent: Feb. 21, 2006

(54) APPARATUS AND METHOD FOR TRANSMITTING AND RECEIVING DATA IN A CDMA COMMUNICATION SYSTEM

(75) Inventors: Yu-Suk Yun, Seoul (KR); Seung-Joo Maeng, Songnam-shi (KR); Hee-Won Kang, Seoul (KR); Soon-Young Yoon, Seoul (KR); Young-Ky Kim, Seoul (KR)

(73) Assignee: Samsung Electronics Co., Ltd., (KR)

( * ) Notice: Subject to any disclaimer, the term of this patent is extended or adjusted under 35 U.S.C. 154(b) by 811 days.

(21) Appl. No.: 09/729,495

(22) Filed: Dec. 4, 2000

(65) Prior Publication Data

US 2002/0067692 A1   Jun. 6, 2002

(30) Foreign Application Priority Data

Dec. 2, 1999   (KR)   ................................. 1999-54601

(51) Int. Cl.
H04J 11/00   (2006.01)
(52) U.S. Cl. ........................ 370/209; 370/208; 370/203
(58) Field of Classification Search ................ 370/208, 370/209, 320, 342, 441, 203
See application file for complete search history.

(56) References Cited

U.S. PATENT DOCUMENTS 6,298,051 B1 * 10/2001 Odenwalder et al. ....... 370/342
6,377,809 B1 *  4/2002 Rezaiifar et al. ........... 455/455
6,473,619 B1 * 10/2002 Kong et al. ............... 455/456.1
6,621,804 B1 *  9/2003 Holtzman et al. .......... 370/329

FOREIGN PATENT DOCUMENTS

CA   2295265   1/2000

* cited by examiner

Primary Examiner—Duc Ho
Assistant Examiner—Thien D. Tran
(74) Attorney, Agent, or Firm—Dilworth & Barrese LLP

(57) ABSTRACT

A method for assigning orthogonal codes used for a first system and a second system in a CDMA system including channels of the first system for spreading a pilot signal, a sync signal, a paging signal and a traffic signal with a first set of orthogonal codes corresponding to orthogonal code numbers in different rows from a set of orthogonal codes arranged in a matrix of m rows and m columns, and channels of the second system for spreading a second set of orthogonal codes corresponding to orthogonal code numbers different from said orthogonal code numbers for the first set of orthogonal codes. The orthogonal codes for the second system are transmitted at a data rate higher than a data rate of the first system. The method comprises the steps of: assigning orthogonal codes corresponding to the orthogonal code numbers of the orthogonal code set associated with at least one of 2n rows to the channels of the first system, wherein a set of the orthogonal codes are arranged in a matrix of subsets of orthogonal codes and inversed orthogonal codes, each subset including 2n rows and 2n columns; and assigning orthogonal codes corresponding to the orthogonal code numbers of the orthogonal code set associated with at least one of the remaining rows to the second system.

12 Claims, 3 Drawing Sheets

APPARATUS AND METHOD FOR TRANSMITTING AND RECEIVING DATA IN A CDMA COMMUNICATION SYSTEM

PRIORITY

This application claims priority to an application entitled "Apparatus and Method for Transmitting and Receiving Data in a CDMA Communication System" filed in the Korean Industrial Property Office on Dec. 2, 1999 and assigned Ser. No. 99-54601, the contents of which are hereby incorporated by reference.

BACKGROUND OF THE INVENTION

1. Field of the Invention

The present invention relates generally to a data communication apparatus and method for a CDMA communication system, and in particular, to an apparatus and method for transmitting and receiving data at a high rate.

2. Description of the Related Art

In general, a CDMA (Code Division Multiple Access) system assigns orthogonal codes to separate forward link channels for transmitting voice and data, as shown in Table 1 below. Table 1 shows a method for assigning the orthogonal codes for separating the forward link channels in a CDMA2000 1X system. Here, Walsh codes can be used for the orthogonal codes.

TABLE 1

| Orthogonal Code | Assignment Method |
|---|---|
| $W_0^{64}$ | Pilot Channel |
| $W_1^{64}$–$W_7^{64}$ | Paging Channel |
| $W_{32}^{64}$ | Sync Channel |
| Others | Traffic (Voice/Data) Channel, Common Control Channel |

As shown in Table 1, a pilot channel uses a $0^{th}$ orthogonal code out of orthogonal codes of spreading factor 64, and a paging channel uses $1^{st}$ to $7^{th}$ orthogonal codes out of the orthogonal codes of spreading factor 64. Further, a sync channel uses a $32^{nd}$ orthogonal code out of the orthogonal codes of length 64, and a common control channel and a traffic channel use other orthogonal codes excepting the assigned orthogonal codes.

The Walsh codes used in the CDMA2000 1X system have a 64-chip length, and a set of the used Walsh codes is shown in Table 2 below. In the Walsh code set structure of Table 2, a row indicates a length of a Walsh code for channel spreading one symbol and a column indicates a number (or index) of a Walsh code. The Walsh codes shown in Table 2 have a length of 64 chips and the number of available Walsh codes is 64.

TABLE 2

Walsh Chip Within Symbol

MODULATION SYMBOL INDEX

|    | 0123 | 4567 | 11 8901 | 1111 2345 | 1111 6789 | 2222 0123 | 2222 4567 | 2333 8901 | 3333 2345 | 3333 6789 | 4444 0123 | 4444 4567 | 4455 8901 | 5555 2345 | 5555 6789 | 6666 0123 |
|----|------|------|---------|-----------|-----------|-----------|-----------|-----------|-----------|-----------|-----------|-----------|-----------|-----------|-----------|-----------|
| 0  | 0000 | 0000 | 0000    | 0000      | 0000      | 0000      | 0000      | 0000      | 0000      | 0000      | 0000      | 0000      | 0000      | 0000      | 0000      | 0000      |
| 1  | 0101 | 0101 | 0101    | 0101      | 0101      | 0101      | 0101      | 0101      | 0101      | 0101      | 0101      | 0101      | 0101      | 0101      | 0101      | 0101      |
| 2  | 0011 | 0011 | 0011    | 0011      | 0011      | 0011      | 0011      | 0011      | 0011      | 0011      | 0011      | 0011      | 0011      | 0011      | 0011      | 0011      |
| 3  | 0110 | 0110 | 0110    | 0110      | 0110      | 0110      | 0110      | 0110      | 0110      | 0110      | 0110      | 0110      | 0110      | 0110      | 0110      | 0110      |
| 4  | 0000 | 1111 | 0000    | 1111      | 0000      | 1111      | 0000      | 1111      | 0000      | 1111      | 0000      | 1111      | 0000      | 1111      | 0000      | 1111      |
| 5  | 0101 | 1010 | 0101    | 1010      | 0101      | 1010      | 0101      | 1010      | 0101      | 1010      | 0101      | 1010      | 0101      | 1010      | 0101      | 1010      |
| 6  | 0011 | 1100 | 0011    | 1100      | 0011      | 1100      | 0011      | 1100      | 0011      | 1100      | 0011      | 1100      | 0011      | 1100      | 0011      | 1100      |
| 7  | 0110 | 1001 | 0110    | 1001      | 0110      | 1001      | 0110      | 1001      | 0110      | 1001      | 0110      | 1001      | 0110      | 1001      | 0110      | 1001      |
| 8  | 0000 | 0000 | 1111    | 1111      | 0000      | 0000      | 1111      | 1111      | 0000      | 0000      | 1111      | 1111      | 0000      | 0000      | 1111      | 1111      |
| 9  | 0101 | 0101 | 1010    | 1010      | 0101      | 0101      | 1010      | 1010      | 0101      | 0101      | 1010      | 1010      | 0101      | 0101      | 1010      | 1010      |
| 10 | 0011 | 0011 | 1100    | 1100      | 0011      | 0011      | 1100      | 1100      | 0011      | 0011      | 1100      | 1100      | 0011      | 0011      | 1100      | 1100      |
| 11 | 0110 | 0110 | 1001    | 1001      | 0110      | 0110      | 1001      | 1001      | 0110      | 0110      | 1001      | 1001      | 0110      | 0110      | 1001      | 1001      |
| 12 | 0000 | 1111 | 1111    | 0000      | 0000      | 1111      | 1111      | 0000      | 0000      | 1111      | 1111      | 0000      | 0000      | 1111      | 1111      | 0000      |
| 13 | 0101 | 1010 | 1010    | 0101      | 0101      | 1010      | 1010      | 0101      | 0101      | 1010      | 1010      | 0101      | 0101      | 1010      | 1010      | 0101      |
| 14 | 0011 | 1100 | 1100    | 0011      | 0011      | 1100      | 1100      | 0011      | 0011      | 1100      | 1100      | 0011      | 0011      | 1100      | 1100      | 0011      |
| 15 | 0110 | 1001 | 1001    | 0110      | 0110      | 1001      | 1001      | 0110      | 0110      | 1001      | 1001      | 0110      | 0110      | 1001      | 1001      | 0110      |

TABLE 2-continued

Walsh Chip Within Symbol

| | | | | | | | | | | | | | | | | |
|---|---|---|---|---|---|---|---|---|---|---|---|---|---|---|---|---|
| 16 | 0000 | 0000 | 0000 | 0000 | 1111 | 1111 | 1111 | 1111 | 0000 | 0000 | 0000 | 0000 | 1111 | 1111 | 1111 | 1111 |
| 17 | 0101 | 0101 | 0101 | 0101 | 1010 | 1010 | 1010 | 1010 | 0101 | 0101 | 0101 | 0101 | 1010 | 1010 | 1010 | 1010 |
| 18 | 0011 | 0011 | 0011 | 0011 | 1100 | 1100 | 1100 | 1100 | 0011 | 0011 | 0011 | 0011 | 1100 | 1100 | 1100 | 1100 |
| 19 | 0110 | 0110 | 0110 | 0110 | 1001 | 1001 | 1001 | 1001 | 0110 | 0110 | 0110 | 0110 | 1001 | 1001 | 1001 | 1001 |
| 20 | 0000 | 1111 | 0000 | 1111 | 1111 | 0000 | 1111 | 0000 | 0000 | 1111 | 0000 | 1111 | 1111 | 0000 | 1111 | 0000 |
| 21 | 0101 | 1010 | 0101 | 1010 | 1010 | 0101 | 1010 | 0101 | 0101 | 1010 | 0101 | 1010 | 1010 | 0101 | 1010 | 0101 |
| 22 | 0011 | 1100 | 0011 | 1100 | 1100 | 0011 | 1100 | 0011 | 0011 | 1100 | 0011 | 1100 | 1100 | 0011 | 1100 | 0011 |
| 23 | 0110 | 1001 | 0110 | 1001 | 1001 | 0110 | 1001 | 0110 | 0110 | 1001 | 0110 | 1001 | 1001 | 0110 | 1001 | 0110 |
| 24 | 0000 | 0000 | 1111 | 1111 | 1111 | 1111 | 0000 | 0000 | 0000 | 0000 | 1111 | 1111 | 1111 | 1111 | 0000 | 0000 |
| 25 | 0101 | 0101 | 1010 | 1010 | 1010 | 1010 | 0101 | 0101 | 0101 | 0101 | 1010 | 1010 | 1010 | 1010 | 0101 | 0101 |
| 26 | 0011 | 0011 | 1100 | 1100 | 1100 | 1100 | 0011 | 0011 | 0011 | 0011 | 1100 | 1100 | 1100 | 1100 | 0011 | 0011 |
| 27 | 0110 | 0110 | 1001 | 1001 | 1001 | 1001 | 0110 | 0110 | 0110 | 0110 | 1001 | 1001 | 1001 | 1001 | 0110 | 0110 |
| 28 | 0000 | 1111 | 1111 | 0000 | 1111 | 0000 | 0000 | 1111 | 0000 | 1111 | 1111 | 0000 | 1111 | 0000 | 0000 | 1111 |
| 29 | 0101 | 1010 | 1010 | 0101 | 1010 | 0101 | 0101 | 1010 | 0101 | 1010 | 1010 | 0101 | 1010 | 0101 | 0101 | 1010 |
| 30 | 0011 | 1100 | 1100 | 0011 | 1100 | 0011 | 0011 | 1100 | 0011 | 1100 | 1100 | 0011 | 1100 | 0011 | 0011 | 1100 |
| 31 | 0110 | 1001 | 1001 | 0110 | 1001 | 0110 | 0110 | 1001 | 0110 | 1001 | 1001 | 0110 | 1001 | 0110 | 0110 | 1001 |
| 32 | 0000 | 0000 | 0000 | 0000 | 0000 | 0000 | 0000 | 0000 | 1111 | 1111 | 1111 | 1111 | 1111 | 1111 | 1111 | 1111 |
| 33 | 0101 | 0101 | 0101 | 0101 | 0101 | 0101 | 0101 | 0101 | 1010 | 1010 | 1010 | 1010 | 1010 | 1010 | 1010 | 1010 |
| 34 | 0011 | 0011 | 0011 | 0011 | 0011 | 0011 | 0011 | 0011 | 1100 | 1100 | 1100 | 1100 | 1100 | 1100 | 1100 | 1100 |
| 35 | 0110 | 0110 | 0110 | 0110 | 0110 | 0110 | 0110 | 0110 | 1001 | 1001 | 1001 | 1001 | 1001 | 1001 | 1001 | 1001 |
| 36 | 0000 | 1111 | 0000 | 1111 | 0000 | 1111 | 0000 | 1111 | 1111 | 0000 | 1111 | 0000 | 1111 | 0000 | 1111 | 0000 |
| 37 | 0101 | 1010 | 0101 | 1010 | 0101 | 1010 | 0101 | 1010 | 1010 | 0101 | 1010 | 0101 | 1010 | 0101 | 1010 | 0101 |
| 38 | 0011 | 1100 | 0011 | 1100 | 0011 | 1100 | 0011 | 1100 | 1100 | 0011 | 1100 | 0011 | 1100 | 0011 | 1100 | 0011 |
| 39 | 0110 | 1001 | 0110 | 1001 | 0110 | 1001 | 0110 | 1001 | 1001 | 0110 | 1001 | 0110 | 1001 | 0110 | 1001 | 0110 |
| 40 | 0000 | 0000 | 1111 | 1111 | 0000 | 0000 | 1111 | 1111 | 1111 | 1111 | 0000 | 0000 | 1111 | 1111 | 0000 | 0000 |
| 41 | 0101 | 0101 | 1010 | 1010 | 0101 | 0101 | 1010 | 1010 | 1010 | 1010 | 0101 | 0101 | 1010 | 1010 | 0101 | 0101 |
| 42 | 0011 | 0011 | 1100 | 1100 | 0011 | 0011 | 1100 | 1100 | 1100 | 1100 | 0011 | 0011 | 1100 | 1100 | 0011 | 0011 |
| 43 | 0110 | 0110 | 1001 | 1001 | 0110 | 0110 | 1001 | 1001 | 1001 | 1001 | 0110 | 0110 | 1001 | 1001 | 0110 | 0110 |
| 44 | 0000 | 1111 | 1111 | 0000 | 0000 | 1111 | 1111 | 0000 | 1111 | 0000 | 0000 | 1111 | 1111 | 0000 | 0000 | 1111 |
| 45 | 0101 | 1010 | 1010 | 0101 | 0101 | 1010 | 1010 | 0101 | 1010 | 0101 | 0101 | 1010 | 1010 | 0101 | 0101 | 1010 |
| 46 | 0011 | 1100 | 1100 | 0011 | 0011 | 1100 | 1100 | 0011 | 1100 | 0011 | 0011 | 1100 | 1100 | 0011 | 0011 | 1100 |
| 47 | 0110 | 1001 | 1001 | 0110 | 0110 | 1001 | 1001 | 0110 | 1001 | 0110 | 0110 | 1001 | 1001 | 0110 | 0110 | 1001 |
| 48 | 0000 | 0000 | 0000 | 0000 | 1111 | 1111 | 1111 | 1111 | 1111 | 1111 | 1111 | 1111 | 0000 | 0000 | 0000 | 0000 |
| 49 | 0101 | 0101 | 0101 | 0101 | 1010 | 1010 | 1010 | 1010 | 1010 | 1010 | 1010 | 1010 | 0101 | 0101 | 0101 | 0101 |
| 50 | 0011 | 0011 | 0011 | 0011 | 1100 | 1100 | 1100 | 1100 | 1100 | 1100 | 1100 | 1100 | 0011 | 0011 | 0011 | 0011 |
| 51 | 0110 | 0110 | 0110 | 0110 | 1001 | 1001 | 1001 | 1001 | 1001 | 1001 | 1001 | 1001 | 0110 | 0110 | 0110 | 0110 |
| 52 | 0000 | 1111 | 0000 | 1111 | 1111 | 0000 | 1111 | 0000 | 1111 | 0000 | 1111 | 0000 | 0000 | 1111 | 0000 | 1111 |
| 53 | 0101 | 1010 | 0101 | 1010 | 1010 | 0101 | 1010 | 0101 | 1010 | 0101 | 1010 | 0101 | 0101 | 1010 | 0101 | 1010 |
| 54 | 0011 | 1100 | 0011 | 1100 | 1100 | 0011 | 1100 | 0011 | 1100 | 0011 | 1100 | 0011 | 0011 | 1100 | 0011 | 1100 |
| 55 | 0110 | 1001 | 0110 | 1001 | 1001 | 0110 | 1001 | 0110 | 1001 | 0110 | 1001 | 0110 | 0110 | 1001 | 0110 | 1001 |
| 56 | 0000 | 0000 | 1111 | 1111 | 1111 | 1111 | 0000 | 0000 | 1111 | 1111 | 0000 | 0000 | 0000 | 0000 | 1111 | 1111 |
| 57 | 0101 | 0101 | 1010 | 1010 | 1010 | 1010 | 0101 | 0101 | 1010 | 1010 | 0101 | 0101 | 0101 | 0101 | 1010 | 1010 |
| 58 | 0011 | 0011 | 1100 | 1100 | 1100 | 1100 | 0011 | 0011 | 1100 | 1100 | 0011 | 0011 | 0011 | 0011 | 1100 | 1100 |
| 59 | 0110 | 0110 | 1001 | 1001 | 1001 | 1001 | 0110 | 0110 | 1001 | 1001 | 0110 | 0110 | 0110 | 0110 | 1001 | 1001 |
| 60 | 0000 | 1111 | 1111 | 0000 | 1111 | 0000 | 0000 | 1111 | 1111 | 0000 | 0000 | 1111 | 0000 | 1111 | 1111 | 0000 |
| 61 | 0101 | 1010 | 1010 | 0101 | 1010 | 0101 | 0101 | 1010 | 1010 | 0101 | 0101 | 1010 | 0101 | 1010 | 1010 | 0101 |
| 62 | 0011 | 1100 | 1100 | 0011 | 1100 | 0011 | 0011 | 1100 | 1100 | 0011 | 0011 | 1100 | 0011 | 1100 | 1100 | 0011 |
| 63 | 0110 | 1001 | 1001 | 0110 | 1001 | 0110 | 0110 | 1001 | 1001 | 0110 | 0110 | 1001 | 0110 | 1001 | 1001 | 0110 |

A CDMA2000 system having the Walsh code set of FIG. 2 is a mobile communication system for servicing voice and data. However, the CDMA2000 system adopts a method for servicing the voice and the data using the similar channel structures. That is, the traffic channel includes a fundamental channel and a supplemental channel: the fundamental channel is used to mainly service the voice and the supplemental channel is used to mainly service the data. However, the CDMA2000 1X system requires a channel structure, which can perform a high-rate data service. Accordingly, there is a demand for an apparatus and method, which can provide a data service supporting a higher rate than that of the CDMA2000 1X system and maintain a compatibility with the CDMA2000 system.

SUMMARY OF THE INVENTION

It is, therefore, an object of the present invention to provide an apparatus and method for communicating voice and high-rate data while maintaining a compatibility with a CDMA2000 system.

It is another object of the present invention to provide an apparatus and method for maintaining orthogonality between a transmission channel of a CDMA2000 system and a channel for transmitting high-rate data in order to transmit voice and high-rate data while maintaining a compatibility with the CDMA2000 system.

It is another object of the present invention to provide an apparatus and method for time-multiplexing data, a pilot signal and a control signal before transmission in order to transmit high-rate data with a high reliability while maintaining a compatibility with a CDMA2000 system.

To achieve the above and other objects, there is provided a method for assigning orthogonal codes used for a first system and a second system in a CDMA system including channels of the first system for spreading a pilot signal, a sync signal, a paging signal and a traffic signal with orthogonal codes corresponding to a first set of orthogonal code numbers in different rows from a set of orthogonal codes arranged in a matrix of m rows and m columns, and channels of the second system for spreading orthogonal codes corresponding to a second set of orthogonal code numbers different from said first set of orthogonal code numbers, said orthogonal codes being transmitted at a data rate higher than a data rate of the first system. The method comprises the steps of: assigning orthogonal codes corresponding to the orthogonal code numbers of the orthogonal code set associated with at least one of 2n rows to the channels of the first system, wherein a set of the orthogonal codes are arranged in a matrix of subsets of orthogonal codes and inversed orthogonal codes, each subset including 2n rows and 2n columns; and assigning orthogonal codes corresponding to the orthogonal code numbers of the orthogonal code set associated with at least one of the remaining rows.

Preferably, the first system is a CDMA2000 system and the second system is an HDR (High Data Rate) system.

Preferably, the orthogonal codes assigned to the first system are Walsh codes of length 64 and the orthogonal codes assigned to the second system are Walsh codes having a length shorter than a length of the Walsh codes of the first system.

Preferably, the Walsh codes assigned to the first system are Walsh codes of length 64 taking as a root at least two of 4-chip Walsh codes of $W_0^4=0000$, $W_1^4=0101$, $W_2^4=0011$ and $W_3^4=0110$, and the Walsh codes assigned to the second system are Walsh codes with spreading factor of below 16, taking as a root the remaining 4-chip Walsh codes excepting said 4-chip Walsh codes used in the first system. Preferably, the orthogonal codes used in the second system are $W_2^4=0011$ and $W_3^4=0110$.

Preferably, the Walsh codes assigned to the first system are Walsh codes of length 64 taking as a root specified one of 4-chip Walsh codes of $W_0^4=0000$, $W_1^4=0101$, $W_2^4=0011$ and $W_3^4=0110$, and the orthogonal codes assigned to the second system are Walsh codes with a length of below 16, taking as a root the remaining 3 4-chip Walsh codes excepting said 4-chip Walsh code used in the first system. Preferably, the orthogonal codes used in the second system are $W_1^4=0101$, $W_2^4=0011$ and $W_3^4=0110$.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
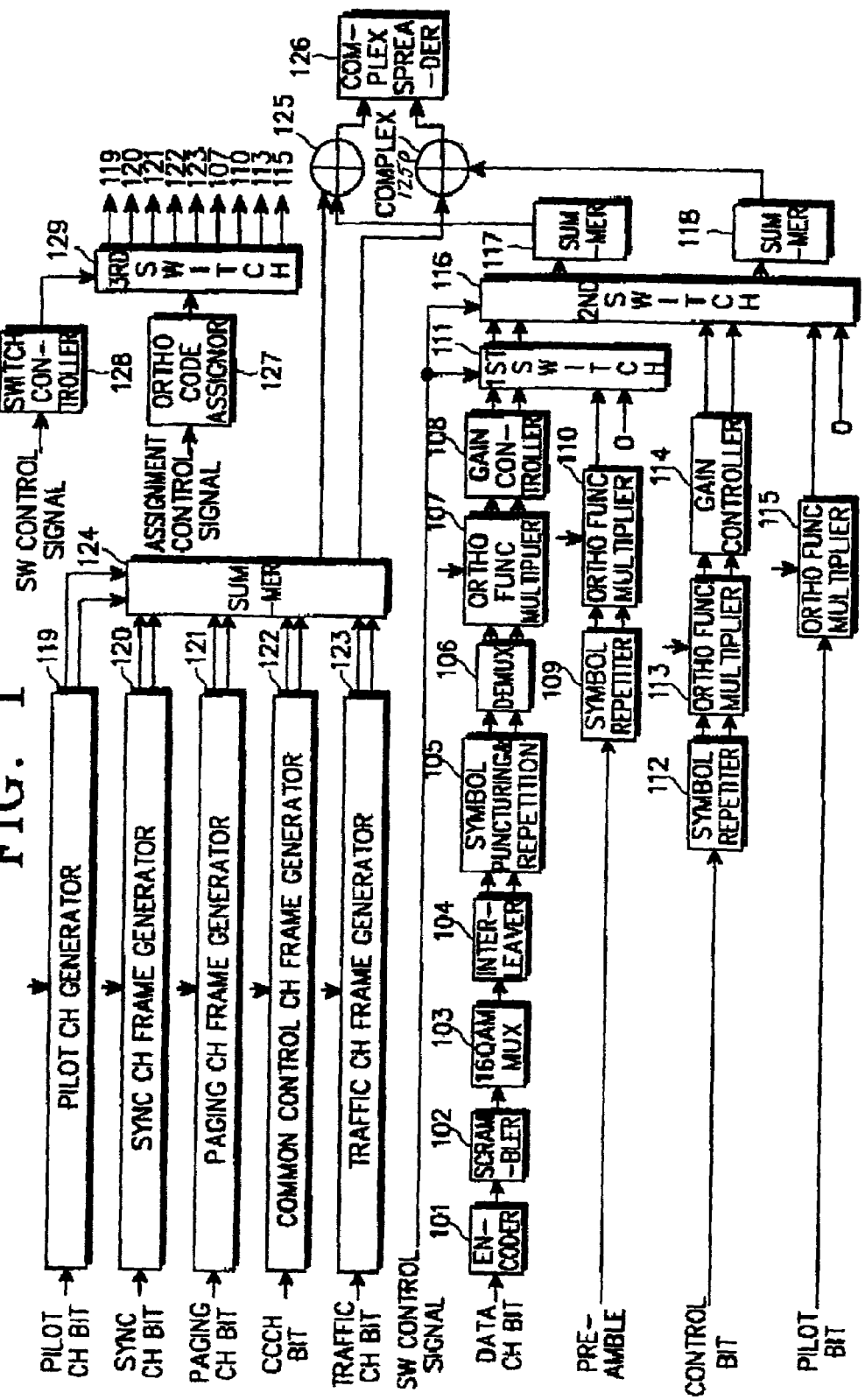
FIG. 1 is a diagram illustrating a structure of a transmitter for a channel communication apparatus in a CDMA communication system according to an embodiment of the present invention.

A preferred embodiment of the present invention will be described herein below with reference to the accompanying drawings. In the following description, well-known functions or constructions are not described in detail since they would obscure the invention in unnecessary detail.

For clear explanation of the present invention, the terminologies used herein will first be defined. The term "CDMA2000 system" used herein refers to a North American-type synchronous system, defined by the IS-2000 standard, out of the IMT-2000 CDMA communication systems. The pilot channel, sync channel, paging channel and common control channel used herein are defined by the IS-2000 standard and equal to the forward pilot channel, forward sync channel, forward paging channel and forward common control channel, respectively. Since the structure and operation of the pilot channel, sync channel, paging channel and common control channel are well known in the art, the detailed description of these channels will be avoided herein for simplicity. In following description, the term "traffic channel" refers to the forward traffic channel, the forward fundamental channel and the forward supplemental channel, defined by the IS-2000 standard. The traffic channel is used to transmit voice and data. A system setup process through acquisition of base station information before sync acquisition and call setup using the foregoing channels and an apparatus and method for transmitting/receiving the traffic channel are well known in the art. Hence, the detailed description will be avoided herein for simplicity.

The CDMA2000 system for servicing the voice and data is so implemented as to service both the voice and the data. However, the CDMA2000 system has a limitation in transmitting a great amount of data at a predetermined time. Therefore, a communication system is require which can service the data at a high rate, and one of such communication systems is a HDR (high data rate) system. The HDR system transmits a great amount of data at a high rate by assigning a channel for communicating data at a high rate to at least one subscriber. Therefore, the HDR system uses the Walsh codes having a higher data rate than that of the Walsh codes used in the CDMA communication system.

When using both the CDMA2000 system and the HDR system, the mobile terminal is able to service the systems, respectively. Here, if the two systems are assigned different frequencies, the Walsh codes are independently used since the operating frequencies of the systems are different. In this case, a mobile terminal for the CDMA2000 system and a mobile terminal for the HDR system are compiled within the mobile terminal. However, when it is desired to implement the mobile terminals which simultaneously use the CDMA2000 system and the HDR system, the base station and the mobile terminal efficiently classify the Walsh codes for assigning the channels of the CDMA system and the channels of the HDR system in order to improve the communication efficiency.

An exemplary embodiment of the present invention proposes a base station and a mobile terminal for a mobile communication system in which the CDMA2000 system is unified with the HDR system. Further, the embodiment proposes a method in which the base station and the mobile terminal efficiently assign the Walsh codes to the channels of the CDMA2000 system and the channels of the HDR system. The channels of the CDMA2000 system may include the pilot channel, synch channel, paging channel, common control channel, and the traffic channels comprised of the fundamental channels and supplemental channels. Further, the channels of the HDR system include one or more data channels. In the following description, the CDMA2000 system will be referred to as a first system and the data communication system (or HDR system) will be referred to as a second system. In addition, the channels of the CDMA2000 system will be referred to as a first group of channels and the channels of the HDR system will be referred to as a second group of channels. Moreover, in the following description, the orthogonal codes have the same meaning as the Walsh codes. Also, the terms "spreading code" and "length of code" used in the embodiment of the present invention have the same meaning throughout this application.

Now, a detailed description of a preferred embodiment will be described with reference to the accompanying drawings and tables.

In the assigning the orthogonal codes for separating the forward link channels as described with reference to Tables 1 and 2, the embodiment of the present invention assigns fixed orthogonal codes to the channel for transmitting high-rate data and assigns other orthogonal codes maintaining an orthogonality with the assigned fixed orthogonal codes to the channels for the existing system, in order to transmit the high-rate data while maintaining a compatibility with the CDMA2000 system.

Table 3 below shows a first method for generating the orthogonal codes to separate the channels provided in the CDMA2000 system from the channels for high-rate data transmission.

TABLE 3

| 0000 | Channels provided in CDMA2000 System |
| 0101 | (First Channel Group) |
| 0011 | Channels for High-Rate Data Transmission |
| 0110 | (Second Channel Group) |

As shown in Table 3, the whole orthogonal codes are divided into two groups: the first half orthogonal codes are used in the same method as in the CDMA2000 system and the other half orthogonal codes are assigned for the dedicated data channels of the data communication system. Here, the data communication system (or HDR communication system) is a system for exclusively servicing the data, and performs a high-rate data communication service using one or more high-rate data channels.

In order to provide the data service at the higher data rate, a second method for dividing the orthogonal codes as shown in Table 4 below can be used.

TABLE 4

| 0000 | Channels provided in CDMA2000 System |
| 0101 | (First Channel Group) |
| 0011 | Channels for High-Rate Data Transmission |
| 0110 | (Second Channel Group) |

Tables 3 and 4 show the orthogonal codes to be assigned to the first group of channels included by the CDMA2000 system and the orthogonal codes to be assigned to the second group of channels included by the HDR system, out of the Walsh codes shown in Table 2. Referring to Table 2, when 4-chip Walsh codes are used, $W_0^4$='0000', $W_1^4$='0101', $W_2^4$='0011', and $W_3^4$='0110'. In this case, in Table 3, $W_0^4$='0000' and $W_1^4$='0101' are used as the Walsh codes to be assigned to the first group of channels, and $W_2^4$='0011' and $W_3^4$='0110' are used as the Walsh codes to be assigned to the second group of channels. In this case, the CDMA system can use 64-chip Walsh codes taking $W_0^4$='0000' and $W_1^4$='0101' as a root, and the HDR system can use the 4-chip Walsh codes of $W_2^4$='0011' and $W_3^4$='0110', as they are. By classifying the Walsh codes as stated above, it is possible to efficiently use the Walsh codes in the set of the available Walsh codes of Table 2, and to prevent the Walsh codes from being assigned repeatedly. Further, in Table 4, the orthogonal codes taking '0000' as a root are assigned to the CDMA2000 system and the other orthogonal codes including '0101', '0011' and '0110' are assigned to one dedicated data channel(Dedicated data channel is only data transmission channel).

When the Walsh codes are assigned in the methods shown in Tables 3 and 4, the paging channel belongs to an orthogonal code area assigned to the data channel. Therefore, it is necessary to assign an orthogonal code different from that used for the paging channel in the CDMA2000 system. In addition, there is another method for dividing the orthogonal codes in various types according to the length and assigns them to the orthogonal codes used in the CDMA2000 system and the orthogonal codes used in the dedicated data channel. There are several methods for dividing the orthogonal codes into orthogonal codes to be used in the CDMA2000 system and orthogonal codes to be used in the dedicated data channel.

Table 5 below shows a preferred method for assigning the orthogonal codes for separating the forward link channels using the orthogonal codes generated according to the orthogonal code generating method described with reference to Tables 3 and 4.

TABLE 5

| Orthogonal Code | Assignment Method |
| --- | --- |
| $W_0^{64}$ | Pilot Channel |
| $W_1^{64}$ | Paging Channel |
| $W_{32}^{64}$ | Sync Channel |
| $W_2^4$, $W_3^4$ | Dedicated Data Channel |
| Others | Traffic (Voice/Data) Channel, Common Control Channel |

Referring to Table 5, in order to maintain a compatibility between the CDMA2000 system and the HDR system, the pilot channel, the paging channel and the sync channel, which are the first-group channels, are assigned the orthogonal codes available in the CDMA2000 system, and the second-group channels of the HDR system are fixedly assigned the orthogonal codes of length 4. That is, in Table 5, the orthogonal codes used in the CDMA2000 system and the orthogonal codes for the high-rate data communication channels use different orthogonal codes having different lengths. Here, one set of orthogonal codes are used for the orthogonal codes for separating the channels for the data service with the CDMA2000 system, and the orthogonal codes assigned to the channels of the CDMA2000 system and the channels for the data service must be so arranged as to maintain the orthogonality among them.

Accordingly, as shown in Table 5, a $0^{th}$ Walsh code $W_0^{64}$ out of the Walsh codes of length 64 is assigned to the pilot channel, a $1^{st}$ Walsh code $W_1^{64}$ out of the Walsh codes of length 64 is assigned to the paging channel, and a $32^{nd}$ Walsh code $W_{32}^{64}$ out of the Walsh codes of length 64 is assigned to the sync channel. The $2^{nd}$ and $3^{rd}$ Walsh codes $W_2^4$ and $W^{34}$ of length 4 maintaining an orthogonality with the above assigned Walsh codes are assigned for the high-rate data transmission, and all the available Walsh codes, e.g., $4^{th}$, $5^{th}$, $8^{th}$ and $9^{th}$. Walsh codes $W_4^{64}$, $W_5^{64}$, $W_8^{64}$ and $W_9^{64}$ of length 64, being orthogonal with the Walsh codes assigned for the high-rate data transmission are assigned to the common control channel and the traffic channel for transmitting the voice and data in the CDMA2000 system. By assigning the orthogonal codes as described with reference to Table 5, an orthogonality is maintained between the first-group channels provided in the CDMA2000 system and the second-group channels for the high-rate data transmission, so that the HDR system can transmit the high-rate data while maintaining a compatibility with the CDMA2000 system.

Table 5 shows an example of assigning the orthogonal codes having the different lengths to the first-group channels of the CDMA2000 system and the second-group channels used for the data service. In this case, in order to service the high-rate data, the number of the traffic channels assigned for the data service is larger than the number of the code channels assigned for the voice service. In addition, the orthogonal codes assigned to the second-group channels of the HDR system may have the same length as the orthogonal codes used in the CDMA2000 system. In this case, it is possible to obtain the same result by assigning more orthogonal codes to the channels for the data service. Here, the CDMA2000 system, when one traffic channel is assigned to each user, assigns one orthogonal code to one channel. However, the second-group channels of the HDR system are transmitted to large many of users on a time-division basis for the high-rate data transmission. That is, the HDR system segments data into a plurality of code channels using one data channel structure and assigns orthogonal codes to the segmented data for despread the data. Therefore, it is possible to transmit data at the high data rate, and the user to whom the data will be transmitted is determined using the orthogonal code assigned to a preamble preceding a frame.

The maximum data rate of the dedicated data channel according to the orthogonal code assignment method described with reference to Tables 3 and 4 varies according to a coding rate and a modulation/demodulation method. When 16-QAM (Quadrature Amplitude Modulation) is used, the maximum data rate is determined as shown in Table 6 below.

TABLE 6

| Orthogonal Code Assignment Method | Coding Rate | Max Data Rate |
| --- | --- | --- |
| Method of Table 3 | ½ | 1.2288 Mbps |
|  | ⅔ | 1.6384 Mbps |
|  | ¾ | 1.8432 Mbps |

TABLE 6-continued

| Orthogonal Code Assignment Method | Coding Rate | Max Data Rate |
| --- | --- | --- |
| Method of Table 4 | ½ | 1.8432 Mbps |
|  | ⅔ | 2.4576 Mbps |
|  | ¾ | 2.7648 Mbps |

When QPSK (Quadrature Phase Shift Keying) modulation is used instead of the 16-QAM, the maximum data rates of Table 6 are halved. Further, when BPSK (Binary Phase Shift Keying) modulation is used, the maximum data rates become ¾ the maximum data rates of Table 6. It is obvious to those skilled in the art to determine the maximum data rate for other modulation/demodulation methods.

Now, with reference to FIGS. 1 and 2, a detailed description will be made regarding the structure and operation of a base station transmitter and a mobile terminal receiver for transmitting and receiving high-rate data while maintaining a compatibility with the CDMA2000 system.

FIG. 1 shows a base station transmitter of a mobile communication system, for performing a communication function while maintaining a compatibility between the CDMA2000 system and the HDR system according to an embodiment of the present invention.

The channels of the CDMA2000 system, shown in FIG. 1, include transmitters for the pilot channel, sync channel, paging channel, common control channel, traffic channel and a channel for transmitting the high-rate data. Therefore, the transmitters for the pilot channel, sync channel, paging channel, common control channel and traffic channel are identical to the transmitters provided in the CDMA2000 system. Thus, the detailed description of the transmitters will be avoided herein for simplicity. A structure of the transmitters for the second-group channels of the HDR system for high-rate data transmission will be described below with reference to FIG. 1.

Referring to FIG. 1, the second-group channels for the high-rate data transmission are comprised of data, a preamble, a control bit and a pilot bit. A data transmission operation of the HDR system will be described below.

An encoder 101 encodes input data of the data channel, for error correction at a receiver. A scrambler 102 scrambles the symbol data encoded by the encoder 101. A 16-QAM modulator 103 performs 16-QAM modulation on the signal scrambled by the scrambler 102. Although an embodiment shown in FIG. 1 includes the 16-QAM modulator, it can also use the different type of modulator. The signal modulated by the 16-QAM modulator 103 is separated into an I-channel signal and a Q-channel signal. An interleaver 104 interleaves the I-channel signal and the Q-channel signal modulated by the modulator 103, and a symbol puncturing and repeating part 105 punctures and repeats symbols of the interleaved signals to output rate-matched signals. A demultiplexer 106 demultiplexes the I-channel and Q-channel signals from the symbol puncturing and repeating part 105 to several channels.

The demultiplexer 106 is used to transmit the signals using the whole orthogonal codes assigned to the dedicated data channel. That is, the spreading degree by the orthogonal code depends upon to how many channels the signal from the symbol puncturing and repeating part 105 is to be demultiplexed. When the orthogonal code sets (or groups) are divided as shown in Table 3, a signal input to the demultiplexer 106 can be demultiplexed (or divided) into two parallel signals and the demultiplexed signals can be spread with $W_2^4$ and $W_3^4$, respectively. In this case, a spreading value by the orthogonal codes becomes 4. Alternatively, the signal input to the demultiplexer 106 can be demultiplexed into four parallel signals and the demultiplexed signals can be spread with $W_2^8$, $W_3^8$, $W_6^8$ and $W_7^8$, respectively. In this case, spread factors (SF) become 8. In addition, the signal input to the demultiplexer 106 can be demultiplexed into eight parallel signals and the demultiplexed signals can be spread with $W_2^{16}$, $W_3^{16}$, $W_6^{16}$, $W_7^{16}$, $W_{10}^{16}$, $W_{11}^{16}$, $W_{14}^{16}$ and $W_{15}^{16}$, respectively. In this case, spread factors (SF) become 16. Also, the signal input to the demultiplexer 106 could be divided into 16 parallel signals and spread by the 16 Walsh codes respectively matched, wherein a spreading factor (SF) by the orthogonal code is 32. Additionally, when channel is assigned in a HDR system and CDMA 200 system in which each orthogonal code is divided as stated above, spreading factor (SF) of channel orthogonal code assigned to the data dedicated channel is 64 like that of CDMA 2000 system. When the demultiplexer 106 demultiplexes its input signal into several parallel signals and spreads the demultiplexed signals with their associated orthogonal codes as stated above, the respective orthogonal codes all belong to the set of the orthogonal codes assigned to the dedicated data channel, and a set of the whole orthogonal codes used in an orthogonal function multiplier 107 is equal to the set of the orthogonal codes allocated to the dedicated data channel. In addition to the foregoing method, there are several methods of demultiplexing the input signal of the demultiplexer 106 into parallel signals. Here, it is well known to those skilled in the art with which orthogonal codes the respective parallel signals should be spread. When the orthogonal code sets are divided as shown in Table 4, the signal input to the demultiplexer 106 is demultiplexed into 3, 6 or 12 parallel signals and the demultiplexed parallel signals are orthogonally spread in the same method as described above.

The orthogonal function multiplier (or orthogonal code spreader) 107 multiplies the signals demultiplexed by the demultiplexer 106 by their associated orthogonal codes shown in Table 3 or 4. Therefore, the demultiplexed signals maintain an orthogonality among them, and also maintain an orthogonality with the pilot channel, the sync channel, the paging channel, the common control channel and the traffic channel, which are the first-group channels of the CDMA2000 system. The orthogonal function multiplier 107 orthogonally spreads the demultiplexed signals by multiplying the demultiplexed signals by their associated orthogonal codes. A gain controller 108 controls a gain of the orthogonally spread signals. The data signals gain-controlled by the gain controller 108 are input to a $1^{st}$ switch 111.

A symbol repeater 109 repeats a symbol of the preamble and an orthogonal function multiplier (or orthogonal code spreader) 110 multiplies the symbol-repeated preamble by its associated orthogonal code. For the orthogonal code multiplied by the orthogonal function multiplier 110, is used an orthogonal code taking the orthogonal codes for the dedicated data channel, shown in Tables 3 and 4, as a root. Here, the preamble includes identification information indicating a user who uses the channels of the HDR system, and depending on the assigned orthogonal code, it is determined to which user the data succeeding the preamble is to be transmitted. The signal multiplied by the orthogonal function by the orthogonal function multiplier 110 becomes the I-channel signal of the preamble signal, and the Q-channel signal of the preamble signal becomes '0'. Such constructed preamble signal is input to the $1^{st}$ switch 111.

The gain-control signal output from the gain controller 108 and the preamble signal are time-switched by the $1^{st}$ switch 111. The first switch 111 transmits (or switches on) the preamble signal at a frame start point and transmits the data signals after completing transmission of the preamble signal according to a switch control signal. The data signal or the preamble signal controlled (or switched) by the $1^{st}$ switch 111 is input to a second switch 116.

A symbol repeater 112 repeats a control bit and demultiplexes the repeated control bit into an I-channel signal and a Q-channel signal. An orthogonal function multiplier 113 multiplies the I-channel and Q-channel signals demultiplexed by the symbol repeater 112 by associated orthogonal codes. As in the orthogonal function multiplier 110, the orthogonal function used by the orthogonal function multiplier 113 can also be randomly selected from the orthogonal functions used in the orthogonal function multiplier 107. A gain controller 114 controls a gain of the signal output from the orthogonal function multiplier 113 and applies the gain-controlled bit to the second switch 116.

An orthogonal function multiplier 115 multiplies a pilot bit by its associated orthogonal code. For the orthogonal code multiplied by the orthogonal function multiplier 115, is used an orthogonal code taking the orthogonal codes for the dedicated data channel, shown in Tables 3 and 4, as a root. The signal multiplied by the orthogonal function by the orthogonal function multiplier 115 becomes an I-channel signal of the pilot bit, and a Q-channel signal of the pilot bit becomes '0'. Such constructed pilot bit is input to the second switch 116.

An input signal of the second switch 116 includes the output signal of the $1^{st}$ switch 111, the control bit and the pilot bit. The switch control signal for controlling the second switch 116 time-switches the $1^{st}$ switch 111 and the second switch 116 according to the structure of a packet and a slot, shown in FIG. 3 which will be described later. The detailed description of the switch control signal will be given with reference to FIG. 3.

A summer 117 sums up the I-channel signals out of the signals output from the second switch 116, and a summer 118 sums up the Q-channel signals out of the signals output from the second switch 116. That is, the summer 117 and the summer 118 sum up the demultiplexed I-channel and Q-channel signals, respectively. The signals output from the summers 117 and 118 have the structure of a packet 301 and a slot 303, shown in FIG. 3.

The output signals of the summers 117 and 118 are the signals of the HDR system, and these signals are summed again with the output signals of the CDMA2000 system by a summer 125, 125'. That is, the I and Q output signals of the summers 117 and 118 are summed, by the summer 125, 125', with the I and Q signals of the several channel transmitters in the CDMA2000 system, e.g., the signals generated by a pilot channel generator 119, a sync channel frame generator 120, a paging channel frame generator 121, a common control channel frame generator 122 and a traffic channel frame generator 123. The summed signals are applied to a complex despreader 126. The complex despreader 126 complex-spreads the I-channel and Q-channel signals summed by the summer 125, 125' by multiplying the I-channel and Q-channel signals by their associated PN codes (or sequences).

An orthogonal code assignor 127 assigns proper orthogonal codes to the respective channels according to an assignment control signal provided from an upper layer. The upper layer provides the orthogonal code assignor 127 with the channel information requiring assignment of the orthogonal code through the assignment control signal and requests assignment of the orthogonal codes for the correspond channels. The orthogonal code assignor 127 outputs orthogonal codes according to the channel information included in the assignment control signal and the orthogonal code assignment method proposed in the invention. The output orthogonal codes are provided to and stored in the channel transmitter corresponding to the channel information through a $3^{rd}$ switch 129 which is controlled by a switch controller 128, and used for orthogonal spreading. The orthogonal code assignor 127, the switch controller 128 and the $3^{rd}$ switch 129 constitutes a controller for assigning the orthogonal code.

An operation of the controller for assigning the orthogonal code will be described below. The orthogonal code assignor 127 may have a table including information on the orthogonal code set shown in Table 2, and the table may be a table in which the orthogonal codes to be assigned to the first-group channels and the second-group channels are stored by dividing them as shown in Table 3 or 4. In the case of Table 3, for example, the Walsh codes $W_1^{64}$ of length 64 taking $W_0^4$ and $W_1^4$ as a root are stored for the orthogonal codes to be assigned to the first-group channels, and the Walsh codes $W_1^{64}$ taking $W_2^4$ and $W_3^4$ as a root are stored for the orthogonal codes to be assigned to the second-group channels. Here, the orthogonal codes to be assigned to the second-group channels can be $W_2^4$ and $W_3^4$ (SF=4); $W_2^8$, $W_3^8$, $W_6^8$ and $W_7^8$; or $W_2^{16}$ (SF=8), $W_3^{16}$, $W_6^{16}$, $W_7^{16}$, $W_{10}^{16}$, $W_{11}^{16}$, $W_{14}^{16}$ and $W_{15}^{16}$ (SF=16). Otherwise, there is used Walsh code of spreading factor 32, which can be assigned to the second-group channels in a table 2. In the embodiment of the present invention, the first-group channels use the orthogonal codes of length 64 and the second-group channels use the orthogonal codes of length 4, as shown in Table 5.

During channel assignment, the upper layer outputs the assignment control signal to the orthogonal code assignor 127. The assignment control signal generates control signals for assigning orthogonal codes for the pilot channel, sync channel and paging channel of the CDMA2000 system, and control signals for assigning orthogonal codes designated to the common control channel and the traffic channel. In addition, the assignment control signal generates control signals for assigning orthogonal codes for designating a data channel when transmitting data through the channel of the HDR system. Then, the orthogonal code assignor 127 generates orthogonal codes $W_0^{64}$, $W_1^{64}$ and $W_{32}^{64}$ for the pilot channel, sync channel and paging channel and orthogonal codes for the designated common control channel and traffic channel, according to the assignment control signal. Here, the orthogonal codes assigned to the first-group channels of the CDMA2000 system are the orthogonal codes of length 64 taking $W_0^4$ and $W_1^4$ as a root. In addition, the orthogonal code assignor 127 generates orthogonal codes $W_2^4$ and $W_3^4$ to be assigned to the channels of the HDR system, and the orthogonal codes for the second-group channels have a length of 4 chips, unlike the orthogonal codes of the CDMA2000 system.

Such generated orthogonal codes are applied to the $3^{rd}$ switch 129. The switch controller 128 then controls the $3^{rd}$ switch 129 according to the switch control signal provided from the upper layer. The switch control signal includes channel information requiring assignment of the orthogonal code. The $3^{rd}$ switch 129 applies the orthogonal codes output from the orthogonal code assignor 127 to their associated orthogonal code multipliers 119, 120, 121, 122, 123, 107, 110, 113 and 115, respectively.

Such a structure can be applied to the transmitter of the base station and the mobile terminal. In the embodiment of the present invention shown in FIG. 1, one transmitter sums up the channel signals of the CDMA2000 system with the channel signals of the HDR system before transmission. The base station may separately include the transmitters of the CDMA2000 system and the HDR system to output the channel signals. However, the mobile terminal should include the transmitter of FIG. 1. In addition, the receiver should also be able to demodulate the channel signals received from the two systems.

Figure 2:
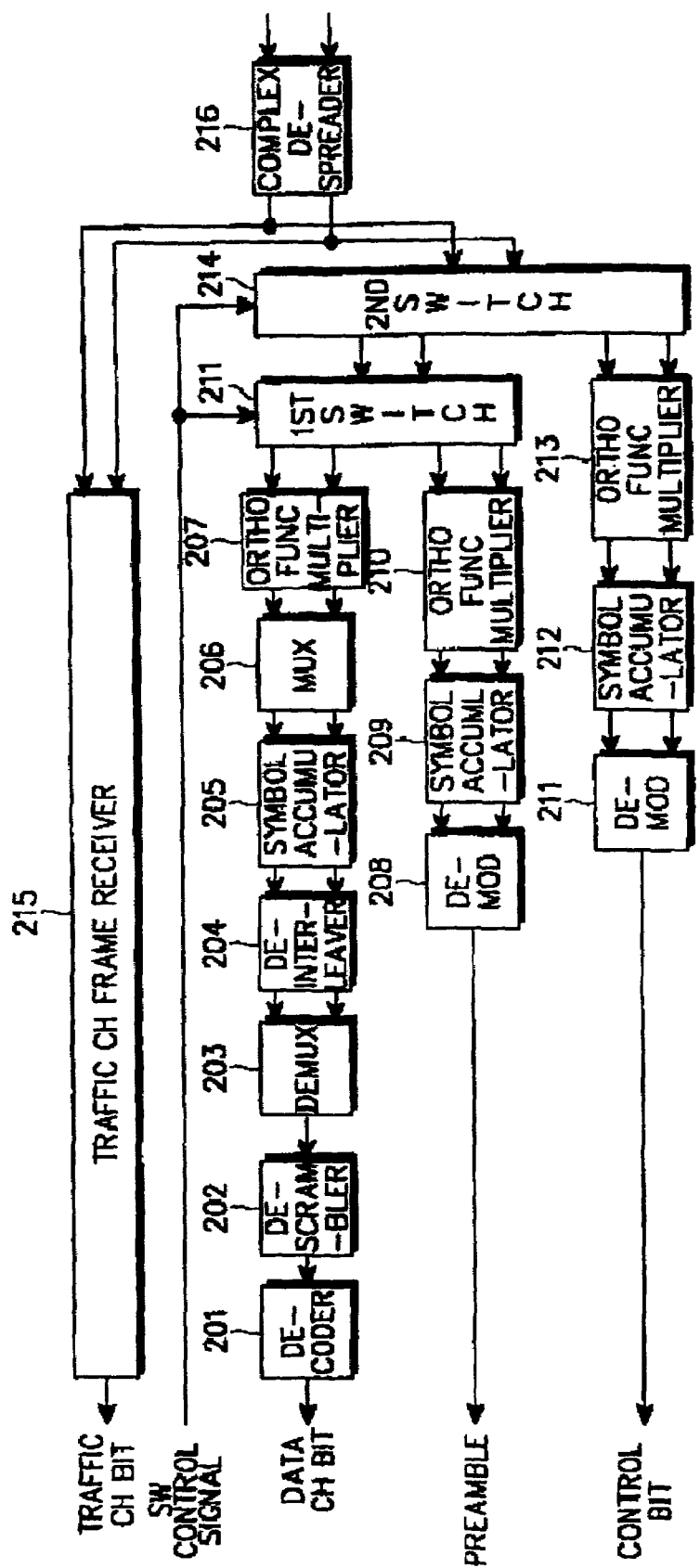
FIG. 2 is a diagram illustrating a structure of a receiver for a channel communication apparatus in a CDMA communication system according to an embodiment of the present invention.

FIG. 2 shows a structure of a data receiver in the CDMA2000 system according to an embodiment of the present invention. It will be assumed herein that the receiver of FIG. 2 is a receiver for the mobile terminal. In FIG. 2, the receiver includes channel receivers of the CDMA2000 systems and channel receivers of the HDR system for the high-rate data transmission. A traffic channel frame receiver 215 is identical to the receivers provided in the CDMA2000 system. The detailed description of the traffic channel frame receiver will be avoided herein for simplicity. The receiver having the structure of FIG. 2 may include the channel receivers of the CDMA2000 system and the channel receivers of the HDR system. Herein, the description will be made focusing on the channel receivers of the HDR system.

Referring to FIG. 2, a complex despreader 216 complex-despreads a received signal and provides the complex-despread signal to the traffic channel frame receiver 215 and a $2^{nd}$ switch 214. The traffic channel frame receiver 215 extracts a traffic channel frame from the complex-despread received signal. The $2^{nd}$ switch 214 switches the provided signal as an input signal of a first switch 211 or an input signal for receiving a control bit, according to a switch control signal. The first switch 211 also switches its input signal as an input for receiving a data channel or an input for receiving a preamble according to the switch control signal.

When the first switch 211 is switched to receive the data channel signal, an orthogonal function multiplier 207 multiplies an output signal of the first switch 211 by an orthogonal code. An output signal of the orthogonal function multiplier 207 corresponds to the signals demultiplexed by the demultiplexer 106 of the transmitter. Therefore, the output signal of the orthogonal function multiplier 207 generates signals corresponding to the I-channel and Q-channel orthogonal functions. A multiplexer 206 multiplexes the signals corresponding to the respective orthogonal functions output from the orthogonal function multiplier 207 into an I-channel signal and a Q-channel signal, respectively. A symbol accumulator 205 accumulates the signals multiplexed by the multiplier 206 and a deinterleaver 204 deinterleaves the accumulated signals. A demodulator 203 demodulates the deinterleaved signals. The demodulator 203 should correspond to the modulator 103 used in the transmitter. A descrambler 202 descrambles the signals demodulated by the demodulator 203 and a decoder 201 decodes the descrambled signals into data channel bits.

When the first switch 211 is switched to receive the preamble, an orthogonal function multiplier 210 multiplies the output signal of the first switch 211 by an orthogonal code and a symbol accumulator 209 accumulates the output signal of the orthogonal function multiplier 210. A demodulator 208 then demodulates the output signal of the symbol accumulator 209 into the preamble. Unlike the demodulator 203 which corresponds to the demodulator 103 of the transmitter, the demodulator 208 is a demodulator for performing sync-demodulation by compensating for channel distortion.

When the $2^{nd}$ switch 214 is switched to receive the control data, an orthogonal function multiplier 213 multiplies the output signal of the $2^{nd}$ switch 214 by an orthogonal code and a symbol accumulator 212 accumulates the output signal of the orthogonal function multiplier 213. A demodulator 211 then demodulates the output signal of the symbol accumulator 212 into the control data. The demodulator 211 performs the same operation as the demodulator 208.

Figure 3:
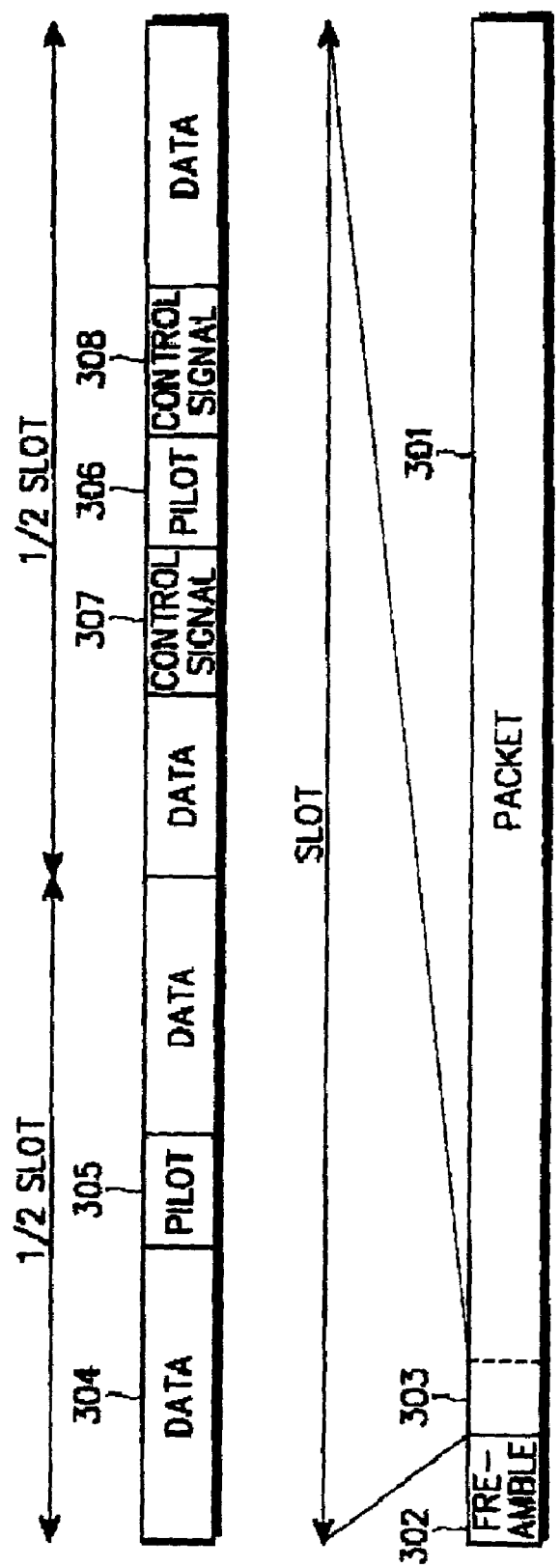
FIG. 3 is a diagram illustrating a structure of a packet and a slot for transmitting high-rate data in a CDMA communication system according to an embodiment of the present invention.

FIG. 3 shows the structure of a packet and a slot from the summers 117 and 118 in the transmitter.

Now, the structure of the packet and the slot for the high-rate data transmission will be described with reference to FIG. 3 and the switch control signal will be described with reference to FIGS. 1 and 2. the high-rate data transmission for one user is performed on a packet unit basis, and the preamble is located at a start point of every packet. Transmitting a preamble 302 indicates a start of the packet, and after transmission of the preamble 302 is completed, a data packet 301 is transmitted. The packet 301 is comprised of a plurality of slots 303, and each slot 303 transmits data 304, pilots 305 and 306, and control signals 307 and 308 on a time-division multiplexing basis. The slot 303 is divided into two ½-slots, and the pilots 305 and 306 are transmitted at the middle of the two ½-sltos, respectively. The control signals 307 and 308 are located at the front and the rear of the pilot 306 in the following ½-slot out of the two ½-slots, respectively. One slot is constructed in this method, and one packet is constructed by assembling such slots. Therefore, the switch control signal of FIG. 1 controls the first and $2^{nd}$ switches 111 and 116 such that the output signals of the summers 117 and 118 in the transmitter have the packet and slot structure shown in FIG. 3, and the switch control signal of FIG. 2 controls the first and $2^{nd}$ switches 211 and 214 such that the received signals have the packet and slot structure shown in FIG. 3. In the embodiment of the present invention, the mobile terminal knows a switching point of the switches based on the base station timing.

Although the control data and the pilot signal can be transmitted on a time-division basis as stated above, it is also possible to transmit necessary control data through a common control channel of the CDMA2000 system after removing a part for transmitting the control data, and to replace a part for transmitting the pilot signal with a pilot channel of the CDMA2000 system. That is, the control signal and the pilot signal are used in the channels of the CDMA2000 system and these signals are information used in the channels for the data service. Therefore, the pilot signal and the control data can communicate using the channels of the CDMA200 system or the data service channels. In the embodiment of the present invention, it is assumed that the pilot signal and the control data are transmitted using the channels of the CDMA2000 system. That is, the pilot signal used for data communication can use the pilot channel generator 119 of the CDMA2000 system, and the control signal used for data communication can use the common control channel frame generator 122 of the CDMA2000 system. In addition, the control signal used for data communication may not use the common control channel of the CDMA2000 system, and instead, can newly define a separate control channel for transmitting the control signal and transmit the control signal through this channel. In this case, for an orthogonal code assigned to the new control channel, one of presently unused orthogonal codes out of the orthogonal codes assigned to the CDMA2000 system, shown in Tables 3 and 4, can be used.

In addition, the control signal used for data communication may not use the common control channel of the CDMA2000 system and instead, can newly define a separate control channel for transmitting the control signal and transmit the control signal through this channel. In this case, for an orthogonal code assigned to the new control channel, one of presently unused orthogonal codes out of the orthogonal codes assigned to the CDMA2000 system, shown in Tables 3 and 4, can be used.

As described above, the CDMA system according to the present invention includes a separate data channel communication apparatus capable of providing high-rate data service to realize high-quality data communication. In addition, the CDMA system with the high-rate data communication function properly assigns the orthogonal codes for channel separation, thereby increasing utilization efficiency of the orthogonal codes.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for assigning orthogonal codes used for a first system and a second system in a CDMA (Code Division Multiple Access) system including first system channels having first system signals for spreading with first orthogonal codes corresponding to a first set of orthogonal code numbers in different rows of a set of orthogonal codes arranged in a matrix of m rows and m columns, and second system channels having second system signals for spreading with second orthogonal codes corresponding to a second set of orthogonal code numbers different from said first set of orthogonal code numbers, comprising the steps of:

assigning to the first system channels orthogonal codes, each being a Walsh code with a length of m chips, taking as a root at least one of 4-chip Walsh codes of $W_0^4=0000$, $W_1^4=0101$, $W_2^4=0011$, and $W_3^4=0110$; and assigning to the second system channels orthogonal codes, each being a Walsh code with a length shorter than m chips, taking as a root remaining 4-chip Walsh codes excepting the 4-chip Walsh codes assigned to the first system channels.

2. The method as claimed in claim 1, wherein the first system is a CDMA2000 system and the second system is an HDR (High Data Rate) system.

3. The method as claimed in claim 1, wherein the Walsh codes assigned to the first system channels are 64 bits long and the Walsh codes assigned to the second system channels are shorter than the length of the Walsh codes of assigned to the first system channels.

4. The method as claimed in claim 1, wherein the Walsh codes assigned to the first system channels are two of 4-chip Walsh codes of $W_0^4=0000$, $W_1^4-0101$, $W_2^4=0011$, and $W_3^4=0110$, and the Walsh codes assigned to the second system channels are Walsh codes with a spreading factor of below 32, taking as a root the remaining 4-chip Walsh codes expecting said 4-chip Walsh codes assigned to the first system channels.

5. The method as claimed in claim 4, wherein the Walsh codes assigned to the second system channels are $W_2^4=0011$, and $W_3^4=0110$.

6. The method as claimed in claim 1, wherein the Walsh codes assigned to the second system channels takes $W_1^4=0101$, $W_2^4=0101$, $W_3^4=0011$ as a root.

7. A channel transmission apparatus in a CDMA system, comprising:
    channel transmitters of a first system, including common channels and dedicated channels;
    channel transmitters of a second system, including data channels having data rate higher than a data rate of the first system;
    an orthogonal code assignor including a table comprised of orthogonal codes to be assigned to the channels of the first system and orthogonal codes to assigned to the second system, wherein Walsh codes assigned to the first system are Walsh codes with a length of m chips, taking as a root at least two of 4-chip Walsh codes of $W_0^4=0000$, $W_1^4=0101$, and $W_3^4=0110$, and Walsh codes assigned to the second system are Walsh codes with a length less than m chips, taking as a root the remaining 4-chip Walsh codes excepting said 4-chip Walsh codes used in the first system; and
    a controller for controlling the orthogonal codes assignor according to assigned channel information and applying the assigned Walsh codes to the channel transmitters of the first and second systems.

8. The channel transmission apparatus as claimed in claim 7, wherein the Walsh codes assigned to the first system are Walsh codes of spreading factor m=64 taking $W_0^4=0000$ and $W_1^4=0101$ as a root and the Walsh codes assigned to the second system are 4-chip Walsh codes of $W_2^4=0011$ and $W_3^4=0110$ with spreading factor of blow 32 chips.

9. A channel transmission apparatus in a CDMA system, comprising:
    channel transmitters of a second system, including common channels and dedicated channels;
    channel transmitters of a second system, including data channels having a data rate higher than a data rate of the first system;
    an orthogonal code assignor including a table comprised of orthogonal codes to be assigned to the channels of the first system and orthogonal codes to be assigned to the second system, wherein Walsh codes assigned to the first system are Walsh codes with a length of m chips, taking as a root a specified one of 4-chip Walsh codes of $W_0^4=0000$, $W_1^4=0101$, $W_2^4=0011$ and $W_3^4=0110$, and the Walsh codes assigned to the second system are Walsh codes with a length of below m chips, taking as a root the remaining 3 4-chip Walsh codes excepting said 4-chip Walsh code used in the first system; and
    a switch controller for controlling the orthogonal code assignor according to assigned channel information and applying the assigned Walsh codes to the channel transmitters of the first and second systems.

10. The channel transmission apparatus as claimed in claim 9, wherein the Walsh codes assigned to the first system are Walsh codes of spreading factor 64, taking $W_0^4=0000$ as a root, and the Walsh codes assigned to the second system are Walsh codes of spreading factor of below 32 chips, taking $W_1^4=0101$, $W_2^4=0011$ and $W_3^4=0110$ as a root.

11. A channel receiving apparatus in a CDMA system, comprising:
    channel receivers of a first system, including common channels and dedicated channels;
    channel receivers of a second system, including data channels having a data rate higher than a data rate of the first system;
    an orthogonal code assignor including a table comprised of orthogonal codes to be assigned to the channels of the first system and orthogonal codes to be assigned to the second system, wherein Walsh codes assigned to the first system are Walsh codes with a length of m chips, taking as a root at least two of 4-chip Walsh codes of $W_0^4=0000$, $W_1^4=0101$, $W_2^4=0011$ and $W_3^4=0110$, and the Walsh codes assigned to the second system are Walsh codes with a length of below m chips, taking as a root the remaining 4-chip Walsh codes excepting said 4-chip Walsh code used in the first system; and
    a switch controller for controlling the orthogonal code assignor according to assigned channel information and applying the assigned Walsh codes to the channel receivers of the first and second systems.

12. The channel receiving apparatus as claimed in claim 11, wherein the Walsh codes assigned to the first system are Walsh codes of spreading factor 64, taking $W_0^4=0000$ and $W_1^4=0101$ as a root, and the Walsh codes assigned to the second system are Walsh codes of a spreading factor of a spreading factor of blow 32 chips, taking $W_2^4=0011$ and $W_3^4=0110$ as a root.

* * * * *